(12) United States Patent
Moorhouse

(10) Patent No.: US 6,880,342 B1
(45) Date of Patent: Apr. 19, 2005

(54) STRUCTURE AND METHOD FOR CONTROLLING INLET SHOCK POSITION OF A HYPERSONIC VEHICLE

(75) Inventor: David J. Moorhouse, Bellbrook, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/670,097

(22) Filed: Sep. 22, 2003

Related U.S. Application Data

(60) Provisional application No. 60/487,297, filed on Jul. 16, 2003.

(51) Int. Cl.[7] .................................................. F02K 7/10
(52) U.S. Cl. .......................................... 60/768; 137/15.2
(58) Field of Search ................. 60/768, 767; 244/53 B; 137/15.1, 15.2

(56) References Cited

U.S. PATENT DOCUMENTS

| | | | | |
|---|---|---|---|---|
| 3,086,357 A | * | 4/1963 | Rubin | ....................... 137/15.2 |
| 4,749,151 A | * | 6/1988 | Ball et al. | ................. 244/53 B |
| 5,085,048 A | * | 2/1992 | Kutschenreuter et al. | ..... 60/768 |
| 6,715,293 B1 | * | 4/2004 | Sillence et al. | ............... 60/768 |

* cited by examiner

Primary Examiner—Ehud Gartenberg
(74) Attorney, Agent, or Firm—AFMCLO/JAZ; Bobby D. Scearce

(57) ABSTRACT

System and method for controlling inlet shock position and airflow Mach number of a hypersonic vehicle is described wherein thermally controlled fuel is controllably injected into the airflow at the inlet of the propulsion system of the vehicle.

8 Claims, 3 Drawing Sheets

STRUCTURE AND METHOD FOR CONTROLLING INLET SHOCK POSITION OF A HYPERSONIC VEHICLE

CROSS-REFERENCE TO RELATED APPLICATION

This application claims priority of the filing date of Provisional Application Ser. No. 60/487,297 filed Jul. 16, 2003, the entire contents of which are incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to inlet structures for hypersonic vehicles, and more particularly to a system and method for controlling the inlet shock position of a hypersonic vehicle using controlled temperature fuel injection into the inlet.

Hypersonic vehicles typically lack aircraft-like performance and maneuverability at speeds greater than Mach-5. Accordingly, conventional structures for hypersonic vehicle generally include a variable geometry intake structures for the propulsion system. These structures use moving walls for the inlet operated by mechanical actuators that require some form of power, typically from a hydraulic system of pumps, pipes and actuators. There is thus a structural weight and complexity penalty and power requirements for the actuation subsystem having no other use aboard the vehicle.

The invention solves or substantially reduces in critical importance problems with prior art inlet structures for hypersonic vehicles as just described by providing system and method for injecting thermally controlled fuel into the airflow at the inlet of the propulsion system for the vehicle. The Mach number of the airflow entering the inlet and the shock angle of the flow at the inlet is thereby controllable. The inlet may therefore be structured to a fixed geometry for the lowest convenient Mach number and the airflow into the inlet is controllable to higher operating Mach numbers using fuel injection according to the invention. Combustion efficiency within the engine of the vehicle is not negatively affected by controllably positioning the shock angle of the flow into the inlet. The structure defining the invention is substantially only an extension of the structural cooling system that will be required in any high-speed flight vehicle. Further, the fuel injected into the inlet airflow would comprise a fuel/air mixture at elevated temperatures that would contribute positively to the thermodynamic effects on the inlet flow. The fuel/air mixture that is introduced into the inlet airflow is mixed at least as well as the combustor fuel and therefore contributes positively to efficient operation of the engine.

It is a principal object of the invention to provide structure and method for controlling the shock position and airflow Mach number at the inlet of a hypersonic vehicle.

It is another object of the invention to provide structure and method for controlling the inlet shock position and airflow Mach number of a hypersonic vehicle using hot fuel injection.

These and other objects of the invention will become apparent as a detailed description of representative embodiments proceeds.

SUMMARY OF THE INVENTION

In accordance with the foregoing principles and objects of the invention, structure and method for controlling inlet shock position and airflow Mach number of a hypersonic vehicle is described wherein thermally controlled fuel is controllably injected into the airflow at the inlet of the propulsion system of the vehicle.

DESCRIPTION OF THE DRAWINGS

The invention will be more clearly understood from the following detailed description of representative embodiments thereof read in conjunction with the accompanying drawings wherein.

DETAILED DESCRIPTION

Figure 1A:
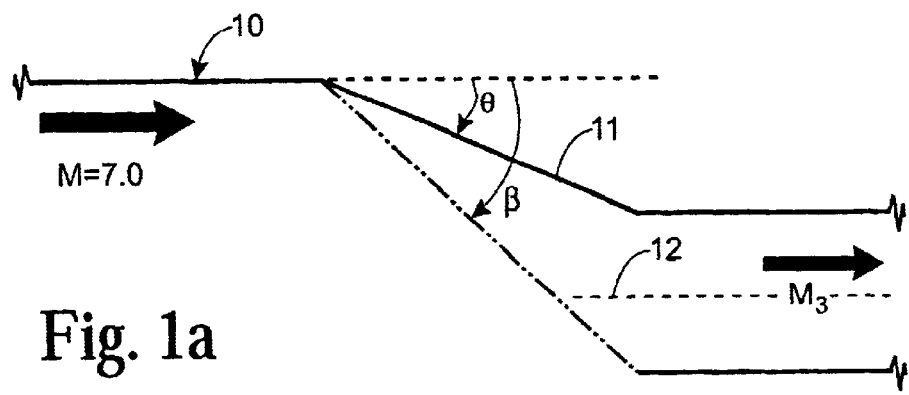
FIG. 1a shows in axial cross section the geometry of a typical inlet designed for Mach 7.
Figure 1B:
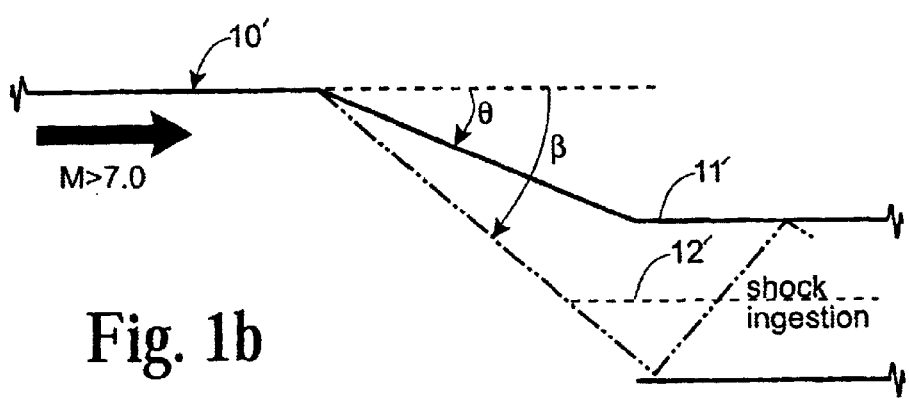
FIG. 1b shows in axial cross section the geometry of the FIG. 1a inlet at greater than Mach 7.
Figure 1C:
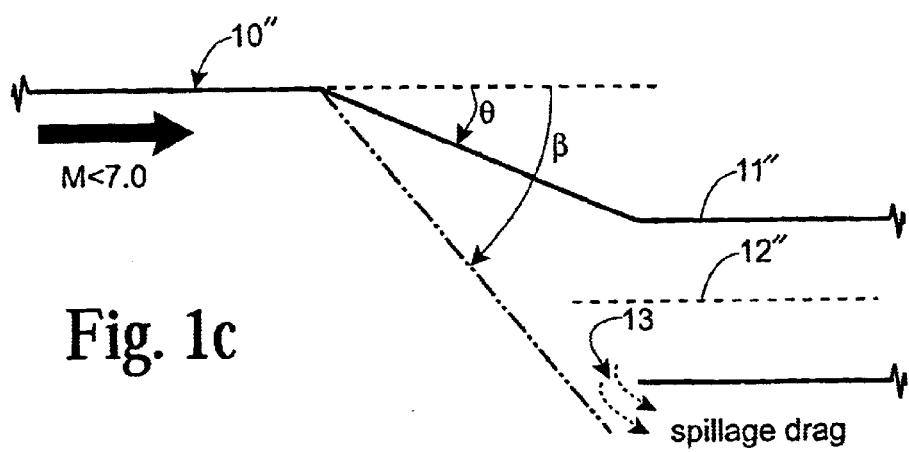
FIG. 1c shows in axial cross section the inlet geometry at lower Mach numbers.

Referring now to the drawings, FIG. 1a shows in axial cross section the geometry of a typical inlet 10 defined by housing 11 for directing airflow along flow axis 12. The geometry of inlet 10 is defined by ramp angle θ and shock on lip angle β, and for Mach 7 with a ramp angle θ of about 6°, angle β is nominally 12.67°. FIG. 1b shows in axial cross section the geometry of the FIG. 1a inlet 10 at greater than Mach 7, and illustrates that at Mach numbers higher than 7 the shock wave enters inlet 10' at a lower shock angle β, which results in negative effects on the combustion efficiency of the engine downstream of inlet 10'. FIG. 1c shows in axial cross section inlet 10" geometry at lower Mach numbers, and illustrates that at lower Mach numbers, angle β is greater than that for Mach 7, and results in some airflow 13, commonly referred to as spillage drag, passing outside the inlet.

In accordance with a governing principle of the invention, the shock is aligned with the lip of the inlet at Mach numbers higher than the design point, so that the inlet can then be designed to a fixed geometry for the lowest convenient flight Mach number and the combustion efficiency will not be degraded due to shock movement at any higher Mach number.

Figure 2:
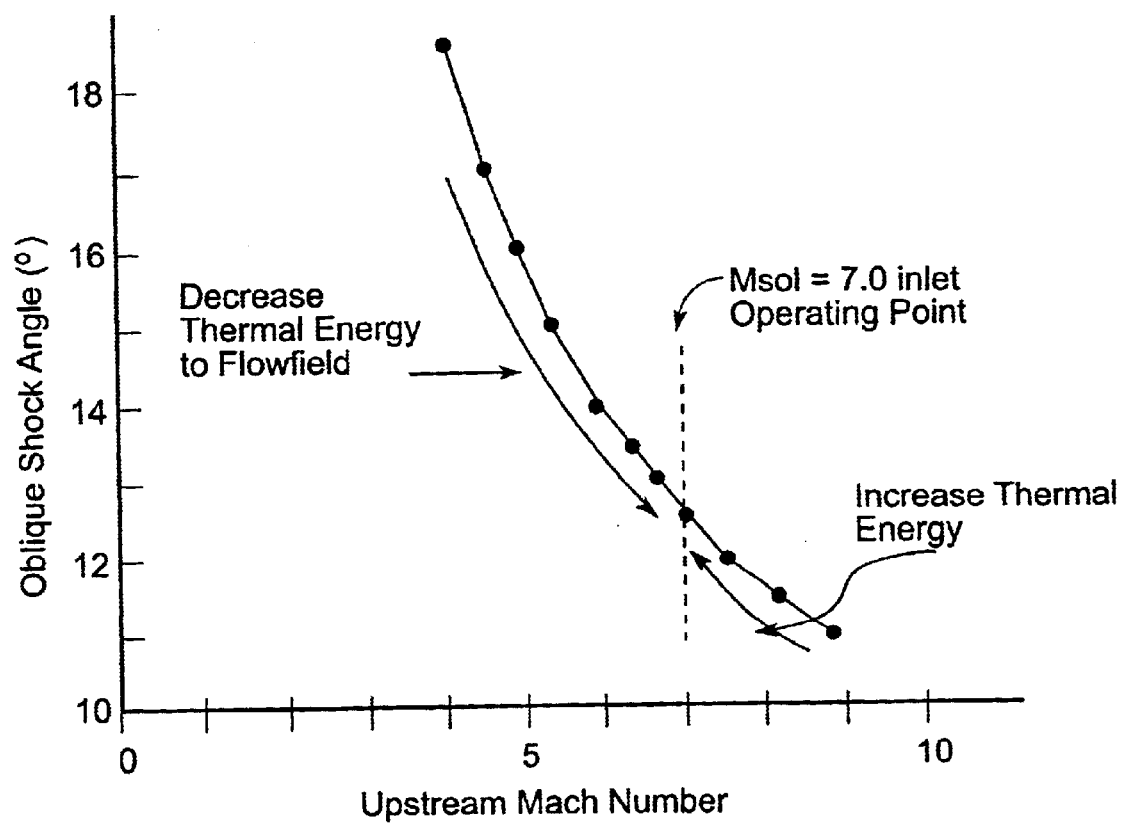
FIG. 2 shows a plot of inlet shock angle versus upstream Mach number.

FIG. 2 is a plot of inlet shock angle (°) versus upstream Mach number illustrating the theoretical result that the shock wave angle is only a function of airflow Mach number. For the fixed inlet geometry shown in FIGS. 1a–1c, θ, β and nominal operating Mach number M are related by, $$\tan\theta = 2\cot\beta\left[\frac{M_2^2\sin^2\beta - 1}{M_2^2(\gamma + \cos 2\beta) + 2}\right] \quad (1)$$

The appropriate equation for Mach number is, $$M = U(\gamma RT)^{1/2} \quad (1a)$$

where U is the airspeed, $\gamma$ and R are constants, and T is the air temperature at the inlet. Increasing airflow temperature effectively reduces the Mach number and produces a corresponding increase in $\beta$.

Related work, (Moorhouse et al, "*Thermal Analysis of Hypersonic Inlet Flow with Exergy-Based Design Methods*", Int J Applied Thermodynamics, Vol 5 (No 4), 161–168 (December 2002)), contained in the provisional application incorporated by reference herein, showed theoretically that thermal energy can be added to, or extracted from, the flow approaching the inlet in order to tailor the effective Mach number and the position of the shock wave.

Figure 3:
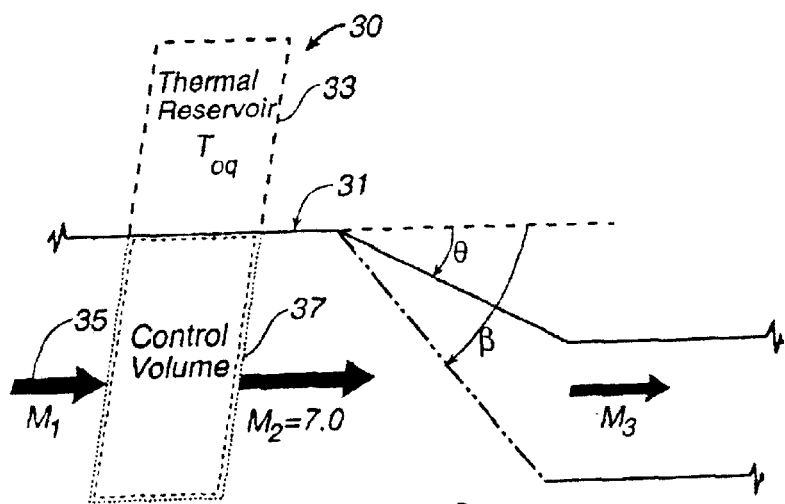
FIG. 3 shows schematically a structure representative of the invention by which thermal energy of inlet shock position is controlled according to the invention.

FIG. 3 shows schematically the structure of a system 30 representative of the invention by which thermal energy of the inlet shock position within inlet 31 is controlled. Accordingly, a temperature reservoir 33 is disposed near the inlet flow 35 in order to exchange thermal energy with a control volume 37 of inlet flow 35. For incoming flow 35 at Mach number $M_1$, the heat input q required to achieve the nominal Mach number $M_2$ exiting control volume 37 is found using the Rayleigh line analysis, $$q = Cp(T_{e2} - T_{e1}) \quad (2)$$

where Cp is the heat capacity of the flow at constant pressure and $T_{o1}$ and $T_{o2}$ are the temperatures respectively of the flows at $M_1$ and $M_2$. It is noted that reservoir 33 is warm compared to flow 35 for $M_1 > M_2$ and cool compared to flow 35 for $M_1 < M_2$. Thus the required heat input (thermal energy) is given by the difference in temperature between the reservoir and the control volume. The required reservoir temperature that is needed to achieve the flow temperature is obtained from, $$\frac{T_{o2}}{T_{o1}} = \left(\frac{1+\gamma M_1^2}{1+\gamma M_2^2}\right)^2 \left(\frac{M_2}{M_1}\right)^2 \left(\frac{1+\frac{\gamma-1}{2}M_2^2}{1+\frac{\gamma-1}{2}M_1^2}\right) \quad (3)$$

The entropy generation rate produced by the heating process can be calculated from, $$\dot{S}_{gen} = \rho_1 V_1 (s_2 - s_1) - \frac{q}{\hat{T}} \quad (4)$$

where $$s_2 - s_1 = R\left(\frac{1}{\gamma-1}\ln\left(\frac{T_2}{T_1}\right) - \ln\left(\frac{\rho_2}{\rho_1}\right)\right) = -R\ln\left(\frac{P_{o2}}{P_{o1}}\right) \quad (5)$$

where $\rho_1$ and $\rho_2$ are the respective densities of the flows at $M_1$ and $M_2$, and R is the gas constant. The analysis is consistent with known engine cycle results that work added to the airflow before combustion increases overall engine efficiency (such as in the compressor of a jet engine) (see e.g., Riggins, "*Analysis of the Magneto-Hydrodynamic (MHD) Energy Bypass Engine for High-Speed Air-Breathing Propulsion*", 26th Airbreathing Propulsion Subcommittee Joint Meeting, Paper 4A-1 APS (Destin Fla., 11 Apr., 2002)). The analysis by Moorhouse et al, supra, assumed an ideal heat exchange between the thermal reservoir and inlet flow, the translation of which into an operating system within a hypersonic vehicle is not practical.

Figure 4:
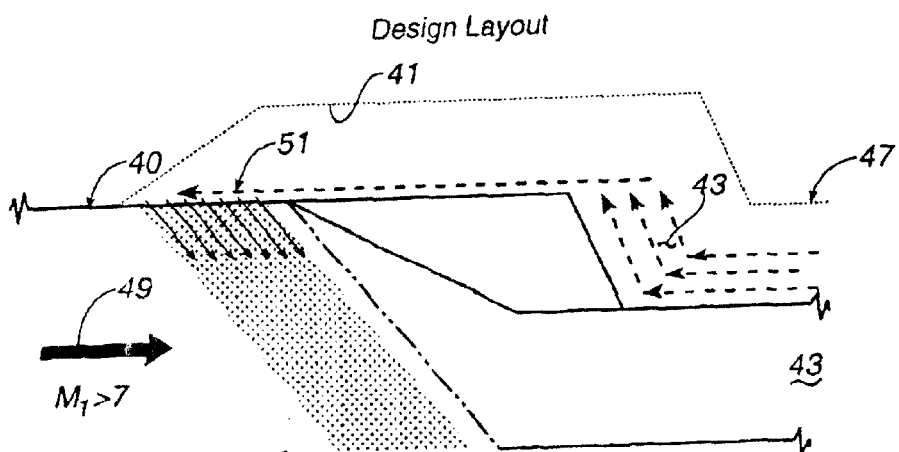
FIG. 4 shows schematically how the representative system of FIG. 2 according to the invention accomplishes thermal energy control of inlet shock position.

Therefore, in accordance with an underlying principle of the invention, and because of the high combustion temperatures and pressures (nominally in the range of about 500 to 3,000° K at 5 to 60 psi) near the inlet to the hypersonic vehicle, the position of the shock wave may be effectively controlled by injecting a spray of hot fuel into the airflow within the inlet. FIG. 4 shows schematically representative structure of a system for thermal energy control of inlet shock position according to the invention. According to the invention, inlet 40 is modified to provide means, such as in the form of duct 41, to conduct heated fuel 43 from combustor region 45 of the engine carried by the hypersonic vehicle. The fuel flow 43 is passed through cooling system 47 and inserted into airflow 49 by suitable injection means 51. Fuel flow 43 may be in vapor or liquid form and may be injected into the $M_1$ airflow 49 for the purpose of controllably modifying the temperature of airflow 49 using an array of spray nozzles or atomizers, or other means occurring to the skilled artisan practicing the invention, the same not considered limiting of the teachings of the invention described and claimed herein. Cooling system 47 may be in the form of conventional aircraft cooling ducts or other suitable means, the specific structure thereof also not considered limiting of the invention, for cooling fuel flow 43 to a desirable temperature, usually in the range less than 1,000° K, and pressure (in the range of about 5 to 25 psi) prior to insertion into airflow 49. The amount of fuel injected into airflow 49 is controlled to achieve the desired effective flow Mach number and to position the shock angle of the inlet as suggested by the dashed and dotted line. Operation of injection means 51 may be configured either to controllably vary the jet mass flow and/or to vary the number and location of the jets. It is well known that injecting mass into a hypersonic flow creates a shock wave, which effect combines with the thermal effect of the fuel injection to position the shock at the desired location. The invention may be structured substantially as an extension to the cooling system of the engine of the hypersonic vehicle and therefore represents substantially no additional weight to the vehicle.

The invention therefore provides system and method for controlling the inlet shock position of a hypersonic vehicle using hot fuel injection. It is understood that modifications to the invention may be made as might occur to one skilled in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

I claim:

1. A system for controlling inlet shock position and airflow Mach number in an engine of a hypersonic vehicle, comprising:
   (a) an air inlet for directing airflow into the engine of a hypersonic vehicle, said inlet defined by a ramp angle and shock on lip angle selected for a first airflow Mach number through said inlet; and
   (b) means disposed near the inlet airflow for exchanging thermal energy with at least a portion of the airflow through said inlet, for one of increasing or decreasing the Mach number of the airflow into the engine; wherein said means for exchanging energy with at least a portion of the airflow through said inlet includes means for injecting a spray of hot fuel in the airflow from upstream of said inlet.

2. The system of claim 1 wherein said ramp angle is about 6°, and said shock on lip angle is about 12.67°.

3. The system of claim 1 wherein said means for exchanging thermal energy with at least a portion of the airflow through said inlet is warmer than the airflow into said inlet for airflow into the engine at a second Mach number larger than said first Mach number, and wherein said means for exchanging thermal energy with at least a portion of the airflow through said inlet is cooler than the airflow into said inlet for airflow into the engine at a third Mach number smaller than said first Mach number.

4. In an air inlet structure for the engine of a hypersonic vehicle, the inlet defined by a preselected ramp angle and shock on lip angle, an improvement comprising means disposed near the inlet airflow for exchanging thermal energy with at least a portion of the airflow through said inlet, for one of increasing or decreasing the Mach number of the airflow into the engine; wherein said means for exchanging energy with at least a portion of the airflow through said inlet includes means for injecting a spray of hot fuel in the airflow from upstream of said inlet.

5. A system for controlling inlet shock position and airflow Mach number in an engine of a hypersonic vehicle, comprising:

(a) an air inlet for directing airflow into the engine of a hypersonic vehicle, said inlet defined by a ramp angle and shock on lip angle selected for a first airflow Mach number through said inlet;

(b) duct means operatively interconnecting said inlet and the combustor region of the engine for conducting heated hot fuel from the combustor region of said engine to said inlet; and (c) means for injecting a spray of said hot fuel into the airflow from upstream of said inlet.

6. The system of claim 5 further comprising means disposed along said duct means for selectively cooling said hot fuel prior to injection into the airflow through said inlet.

7. The system of claim 5 wherein said means for injecting a spray of said hot fuel into the airflow through said inlet comprises an array of spray nozzles or atomizers.

8. The system of claim 5 wherein said ramp angle is about 6°, and said shock on lip angle is about 12.67°.

* * * * *